H. G. CARROLL.
ANTIMIRING DEVICE.
APPLICATION FILED NOV. 15, 1920.

1,425,448.

Patented Aug. 8, 1922.

Inventor:
Herron G. Carroll,
by Spear Middleton Donaldson & Hall
Attys.

UNITED STATES PATENT OFFICE.

HERRON G. CARROLL, OF AYR, NEBRASKA.

ANTIMIRING DEVICE.

1,425,448. Specification of Letters Patent. Patented Aug. 8, 1922.

Application filed November 15, 1920. Serial No. 424,180.

*To all whom it may concern:*

Be it known that I, HERRON G. CARROLL, a citizen of the United States, and resident of Ayr, in the county of Adams and State of Nebraska, have invented certain new and useful Improvements in Antimiring Devices, of which the following is a specification.

My present invention relates to an improved anti-miring attachment designed to be applied to tractors to prevent their sinking so deeply into soft ground as to require their being dug out, as not infrequently happens with tractors as customarily used.

The invention aims to provide an attachment of simple and durable construction which may be economically produced and which may be readily applied to the existing form of tractor, and which will be effective to produce the desired results.

The invention further aims to provide an attachment of such form that it may be used also to mash or flatten down the standing weeds in a field to be plowed and thus facilitate materially the plowing action.

With these and other objects in view the invention includes the novel features of construction and arrangement and combination of parts hereinafter described, and particularly defined by the appended claim.

Figure 1:
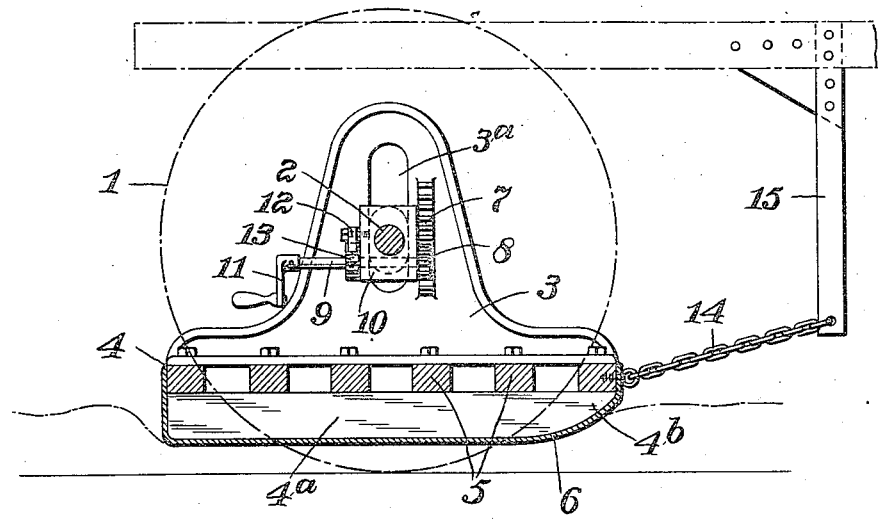
Figure 2:
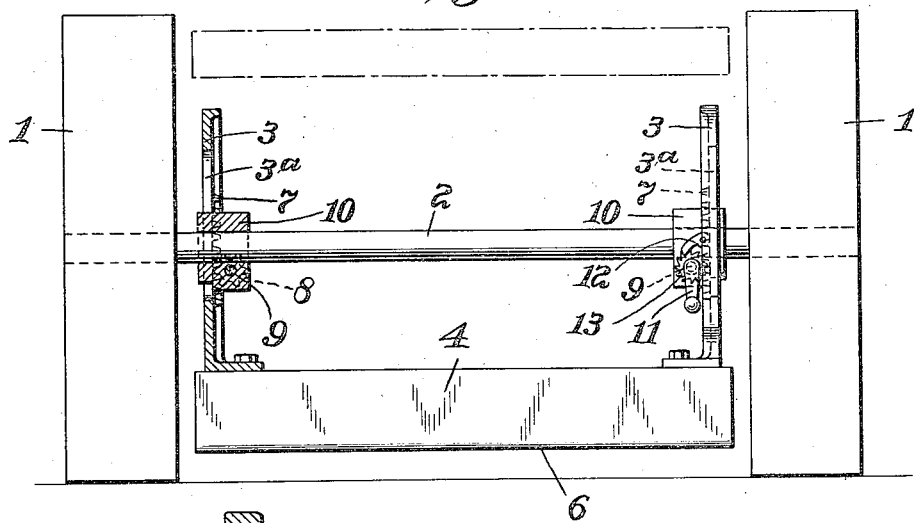
Figure 3:
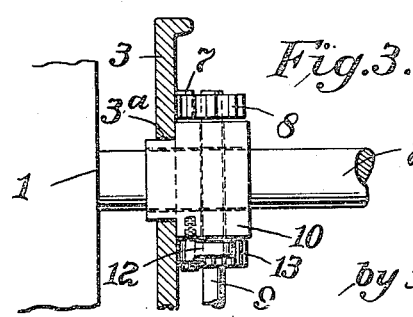

An embodiment of my invention is illustrated in the accompanying drawing in which Fig. 1 is a sectional elevation Fig. 2 is a rear sectional elevation, and Fig. 3 a detail view.

Referring by reference characters to this drawing the numeral 1 designates the tractor driving wheels and 2 the axle. As the tractor may be of any desired design or construction it is deemed unnecessary to illustrate herein more than the rear wheel and axle and these only conventionally.

My anti-miring attachment comprises a broad flat contact member designed to be supported beneath the rear axle and to extend substantially the full distance between the wheels so as to provide an ample surface for bearing on the ground, said bearing surface being positioned normally out of contact with the ground so as not to interfere with the traction of the driving wheels in the normal operation of the tractor.

In the preferred construction of my attachment, as illustrated in the drawing, I provide end members or standards 3 which are provided with vertically elongated slots 3ª through which the axle passes and which provide for the vertical adjustment of the end members or standards which constitute the supporting members for the ground contact member. This ground contact member is designated 4 and is preferably formed of boards or planks 4ª disposed longitudinally of the tractor in a horizontal plane and having rounded forward ends 4ᵇ corresponding in shape approximately to the front end of a sled runner. The said members 4ª are arranged side by side with their edges preferably in contact to provide an uninterrupted under contact surface, and they are connected to the standards 3 and sustained thereby through the intermediary of transverse bars 5 which are connected at their ends in any suitable manner to the lower ends of the standards which are widened out for this purpose as shown, the members 4 being in turn secured to the bars 5 by any suitable or desired means. I prefer to construct the members 4 of wood in which event I provide them with a continuous facing of sheet metal as indicated at 6 secured in position in any suitable manner.

My preferred manner of adjustably supporting the standards 3 is to provide them with vertical racks 7 designed to be engaged by pinions 8 carried by shafts 9 journaled in brackets 10 designed to be carried by the tractor axle. The shafts 9 are provided with operating crank handles 11, and pawls 12 are provided engaging ratchet wheels 13 fast on the shafts 9 to hold the shafts and gears in any position to which they may be adjusted.

To sustain the thrust due to the forward movement of the tractor when the contact surface is bearing on the ground I provide means such as a chain or chains 14 connecting the front end of the supporting member 4 or sled as it may be termed, with a fixed part of the tractor frame, such as the bar 15. Obviously a similar sled may be used in connection with the front axle if found desirable.

With a device as above described positioned under the axle of the driving wheels of the tractor it will be apparent that if ground is encountered which is so soft that the tractor wheels tend to spin or slip and thus dig themselves down, which not infrequently causes them to be so deeply buried as to require the use of shovels to extricate the tractor, the sled or contact device will bear on the ground and by its broad surface prevent the wheels from sinking into the ground to more than a slight extent. The tractor may then be moved to firmer ground in which event the projection of the wheels below the surface of the sled will assist materially in the sledding forward of the tractor, or, if horses or other pulling means is not available the sled through the rack and gear connections described, may be used as a jack to elevate the driving wheels sufficiently to enable firm ground to be tamped under the wheels until sufficient traction is secured to enable the tractor to be propelled forward under its own power, the sled having in the mean time been returned or readjusted to normal position.

By reason of the broad surface of the sled the device may be advantageously used to flatten down standing weeds in advance of the plow, thus facilitating the action of the plow in a manner well understood by those skilled in the art.

My device may also be used as a safety brake in descending steep hills without detriment to the road surface, as it may, by means of the operating gear, be forced down into contact with the road surface with sufficient pressure to operate as an efficient brake or drag, but by reason of its broad bearing the road surface will not be damaged.

Having thus described my invention, what I claim is:

An anti-miring attachment for tractors comprising a broad flat sled member having end standards provided with elongated slots to receive the tractor axle, racks carried by said standards, brackets adapted to be secured to the axle, shafts journaled in said brackets, gears carried by said shafts and engaging said racks, means for operating said gears, and means for locking them against movement.

In testimony whereof I affix my signature.

HERRON G. CARROLL.